M. L. NEES.
VEHICLE TRACK FOR PUBLIC HIGHWAYS.
APPLICATION FILED FEB. 20, 1917. RENEWED DEC. 27, 1918.
1,301,490.
Patented Apr. 22, 1919.
4 SHEETS—SHEET 4.
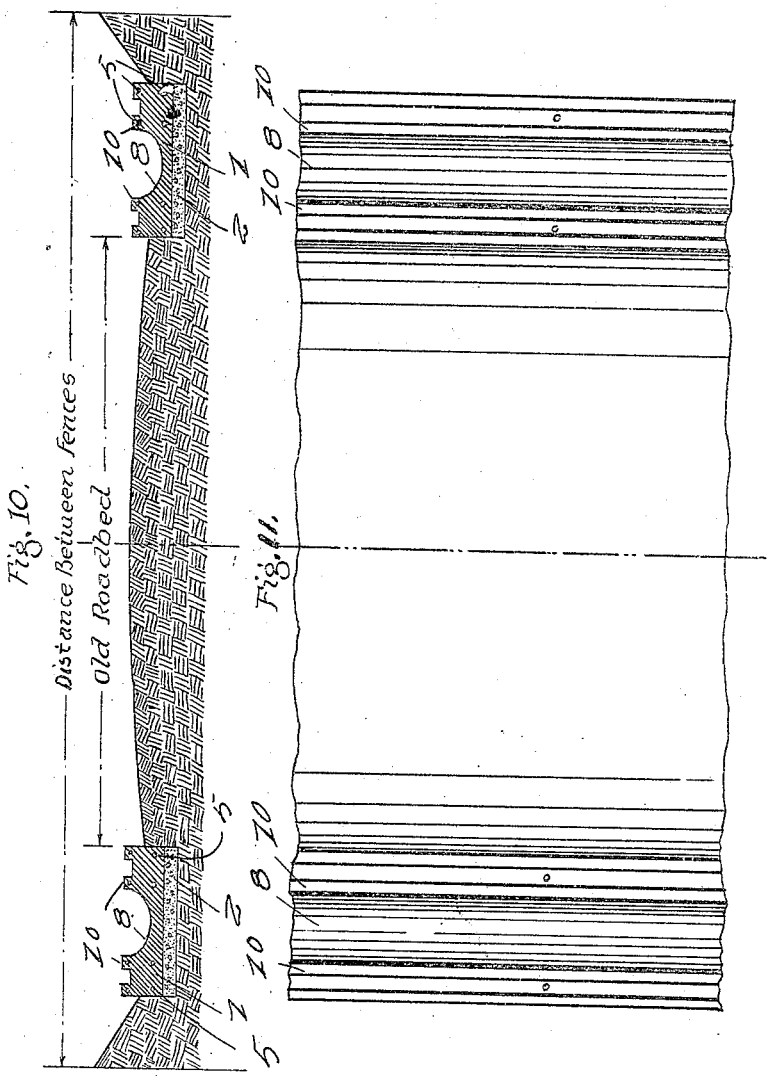

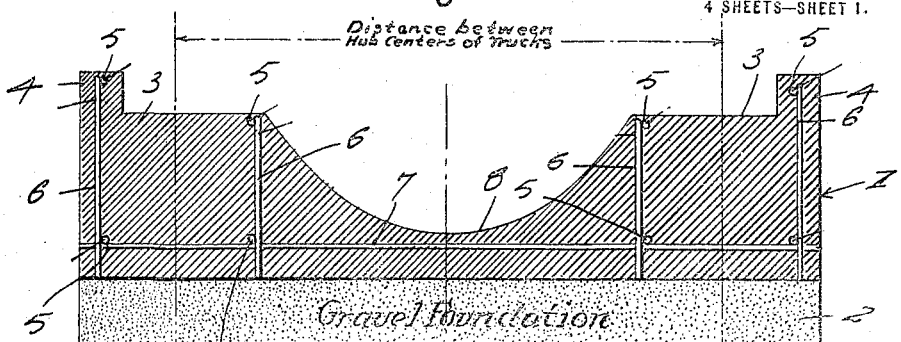
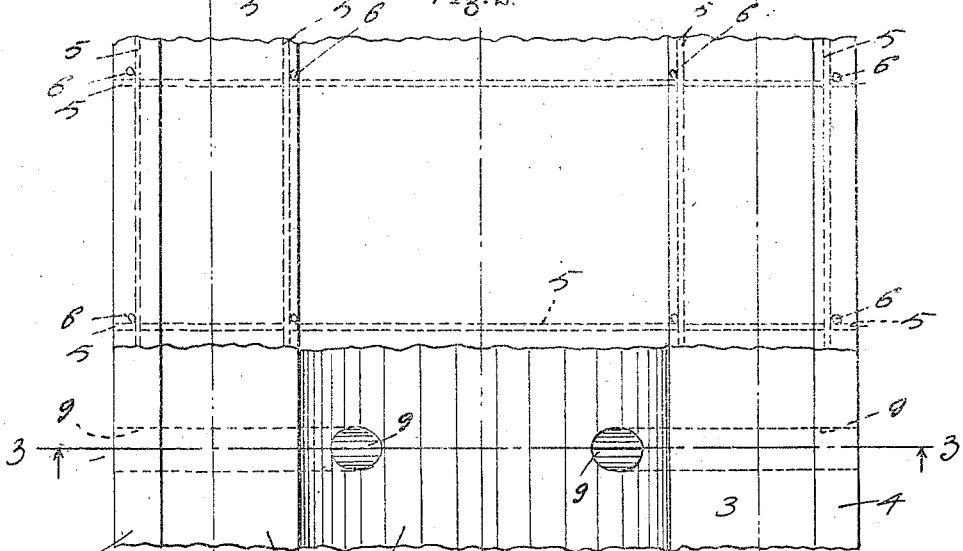
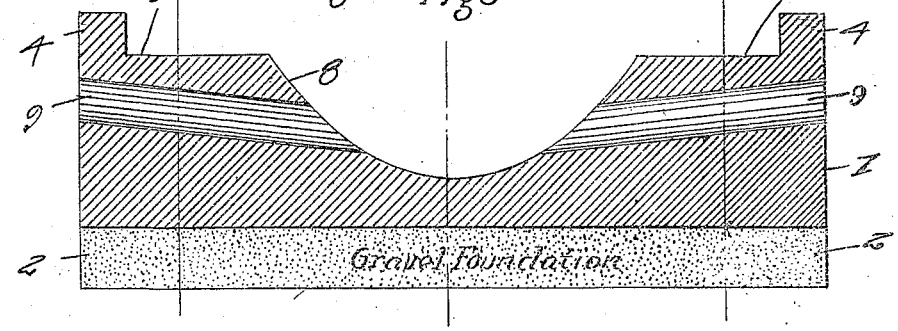

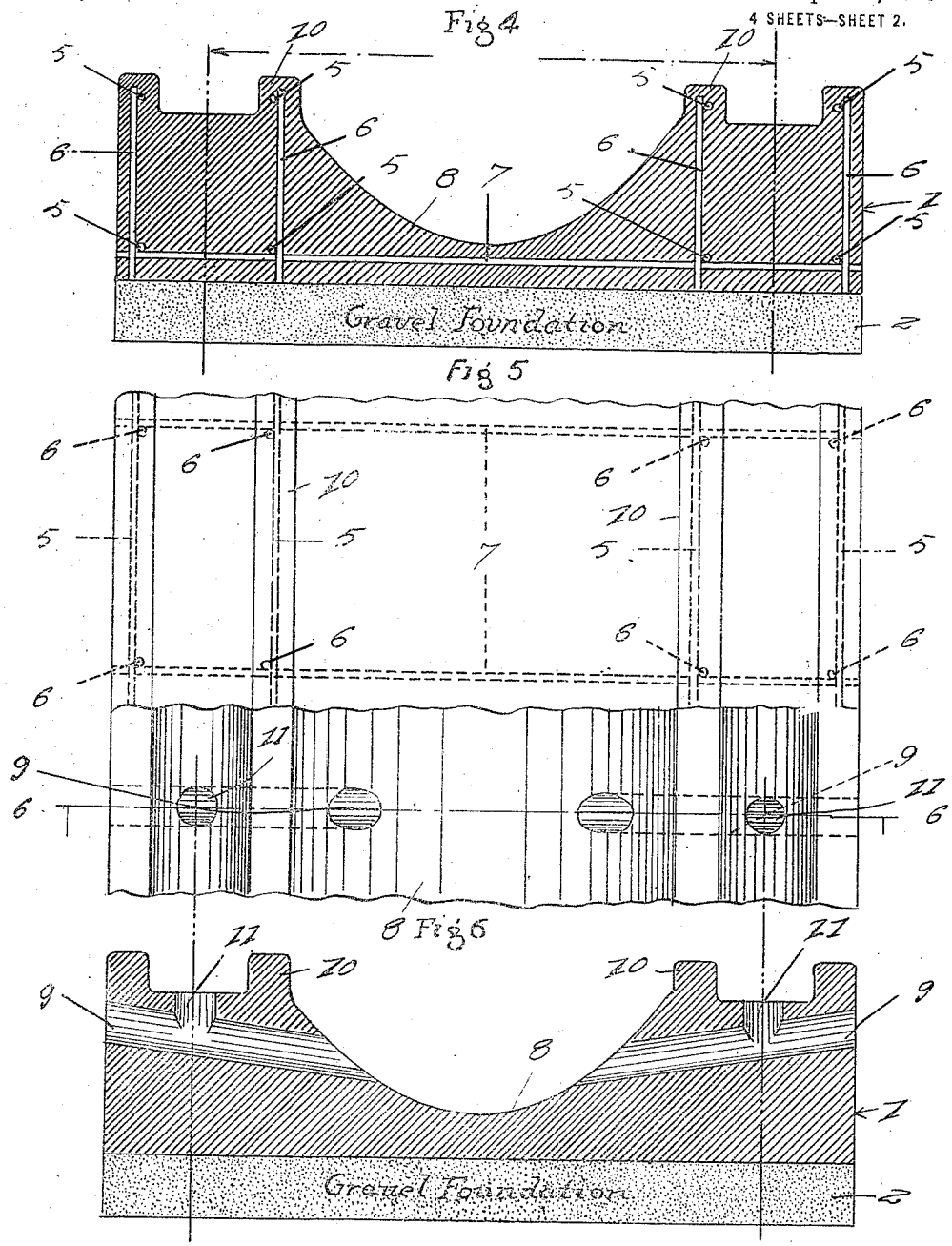

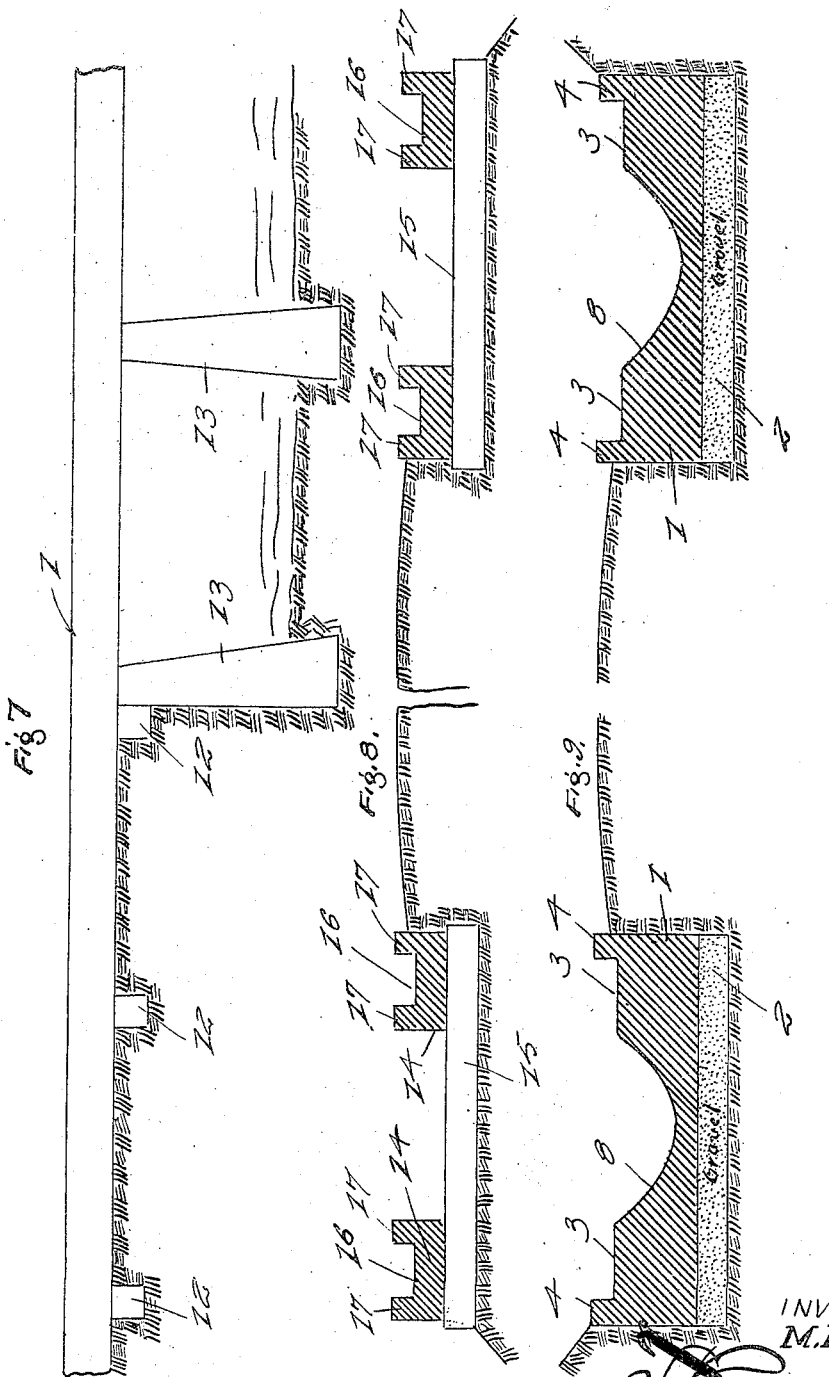

UNITED STATES PATENT OFFICE.

MILTON L. NEES, OF NEW ROSS, INDIANA.

VEHICLE-TRACK FOR PUBLIC HIGHWAYS.

1,301,490.  Specification of Letters Patent.  Patented Apr. 22, 1919.

Application filed February 20, 1917, Serial No. 149,756. Renewed December 27, 1918. Serial No. 268,493.

*To all whom it may concern:*

Be it known that I, MILTON L. NEES, a citizen of the United States, residing at New Ross, in the county of Montgomery and State of Indiana, have invented certain new and useful Improvements in Vehicle-Tracks for Public Highways; and I do hereby declare the following to be a full, clear, and exact description of the invention, such as will enable others skilled in the art to which it appertains to make and use the same.

This invention relates to improvements in tracks, or ways, of the type extended along public highways and over which automobiles and similar vehicles are to be operated, and the primary object of the invention is the provision of a roadway, or track, of this nature so mounted as to have the necessary resiliency and also equipped with a novel drainage system that will effectively keep the track in a dry condition, the drainage system being also designed to receive and carry off water from the highway, so as to prevent the water finding its way beneath the track.

Another object of the invention is the provision of a track or roadway of this nature that is reinforced in an effective and novel manner so as to admit of the roadway withstanding considerable weight.

Other objects will appear and be better understood from that embodiment of my invention of which the following is a specification, reference being had to the accompanying drawings forming a part thereof, in which:

Figure 1 is a transverse sectional view, taken through one form of track or roadway, Fig. 2 is a fragmentary top plan view of Fig. 1, Fig. 3 is a transverse sectional view, taken on the line 3—3 of Fig. 2, Fig. 4 is a transverse sectional view, taken through a modified form of track or roadway, Fig. 5 is a fragmentary sectional plan view of Fig. 4, Fig. 6 is a section taken on the line 6—6 of Fig. 5, Fig. 7 is a detail side elevation, showing the manner of supporting the track over waterways, gullies, or the like, Fig. 8 is a transverse sectional view, taken through a highway equipped with another modified form of trackway, and showing the same mounted on plastic ties, Fig. 9 is a transverse sectional view, taken through a highway equipped with a pair of trackways constructed in accordance with the track shown in Fig. 1, Fig. 10 is a transverse sectional view, taken through a highway equipped with a pair of tracks constructed in accordance with the track illustrated in Fig. 4, and Fig. 11 is a sectional plan view of Fig. 10.

Referring to the drawings in detail, and particularly to Figs. 1 to 3 inclusive, wherein is shown the preferred form of track, the track is shown as comprising a concrete body 1, which rests upon a foundation 2, formed, preferably, of gravel, so as to admit of the track having the required amount of resiliency. The upper side of the body 1 is provided with a pair of spaced parallel treadways 3, and guard flanges 4 are located at the outer edges or sides of the treadways 3, and formed integral with the body 1 and serve to prevent lateral shifting of a vehicle traveling along the tread surfaces 3. A plurality of longitudinally extending reinforcing rods 5 are embedded within the body 1 and flanges 4 and located at advantageous points, as shown in Fig. 1, and a plurality of spaced rows of vertically disposed reinforcing rods 6 extend through the body and the flanges, as shown in Fig. 1, and spaced transverse reinforcing rods 7 extend through the body 1 and are arranged in intersecting relation with the rods 5 and 6. The manner in which the body 1 is reinforced by the rods 5, 6, and 7, enables the body to withstand considerable weight. The body 1 of the trackway is provided with a centrally disposed longitudinally extending groove 8, which is of substantially semicircular shape in cross section and provides a conduit so that water accumulating around the body 1 may readily flow through the conduit 8 and be discharged at any desired point. The body is provided, at opposite points, with inclined conduits 9, which have their upper ends opening into the sides of the body 1, and their lower ends communicating with the conduit 8. The conduits 9 admit of water being drained from the highway or roadbed and discharged into the conduit 8, so that it can be conveyed to a suitable place of deposit.

In Figs. 4, 5 and 6, the body 1 is shown provided with inwardly disposed guard flanges 10, which are located in opposed and spaced relation with the outer flanges 4, and define with the flanges 4 tread portions which receive the wheels of a vehicle traveling along the trackway or body 1. The body 1 is provided with a plurality of vertical openings 11, which communicate the tread portions 3 with the conduits 9, so that water accumulating within the tread portions can be drained through the openings 11 into the conduits 9 and discharged into the conduit 8.

In Fig. 7, the track 1 is shown as having a portion thereof resting on concrete ties 12, and with another portion extending across a waterway or gully A and supported by pillars 13.

In Fig. 8 there is shown a pair of tracks each consisting of a pair of sections 14 supported by concrete ties 15. Each of the sections 14 has the upper side thereof provided with a wheel-receiving groove 16 and a pair of opposed guard flanges 17. The type of track shown in Fig. 8 can be easily placed in position, and either of the sections can be conveniently removed when damaged to an extent wherein it will be unfit for use, so that a new section can be substituted.

It is evident that various changes might be resorted to in the construction, form and arrangement of the several parts without departing from the spirit and scope of the invention as claimed.

Having thus described my invention what I claim as new, is:

A vehicle track comprising a body having conduits, tread surfaces formed upon said body, integral flanges formed upon the edges of the tread surfaces, longitudinally extending reinforcing members extending through the body and flanges, vertically disposed reinforcing members extending through the body and flanges, and transversely extending reinforcing members in the body and intercrossing the vertically and longitudinally extending reinforcing members.

In testimony whereof I affix my signature in presence of two witnesses.

MILTON L. NEES.

Witnesses:
QUINCY E. BUNDY,
WILLIAM S. HARDING.

Copies of this patent may be obtained for five cents each, by addressing the "Commissioner of Patents, Washington, D. C."